United States Patent [19]
Ibuchi

[11] Patent Number: 4,668,079

[45] Date of Patent: May 26, 1987

[54] ELECTROPHOTOGRAPHIC COPYING MACHINE WITH A FUNCTION FOR SELECTING HALF-SIZED COPY PAPER

[75] Inventor: Yoshiaki Ibuchi, Nara, Japan

[73] Assignee: Sharp Kabushiki Kaisha, Osaka, Japan

[21] Appl. No.: 761,694

[22] Filed: Aug. 2, 1985

[30] Foreign Application Priority Data

Aug. 6, 1984 [JP] Japan ................................ 59-166853

[51] Int. Cl.[4] ................................ G03B 27/44

[52] U.S. Cl. ................................ 355/46; 355/14 R

[58] Field of Search .................... 355/14 R, 46, 25, 75

[56] References Cited

U.S. PATENT DOCUMENTS 4,162,848 7/1979 Platt ................................ 355/46 X 4,247,192 1/1981 Komori et al. .................. 355/46 X

*Primary Examiner*—Richard A. Wintercorn

*Attorney, Agent, or Firm*—Birch, Stewart, Kolasch & Birch

[57] ABSTRACT

A copying machine comprising a document size detecting circuit for detecting the paper size of a document placed on a document table and a dual page copying circuit for copying two documents of the same size placed on the document table onto different copy papers respectively, and a copying machine having the function of selecting half-size copy paper which comprises a circuit for selecting copy paper of a size half that detected by the above-mentioned document size detecting means.

2 Claims, 7 Drawing Figures

Fig. 3(A)
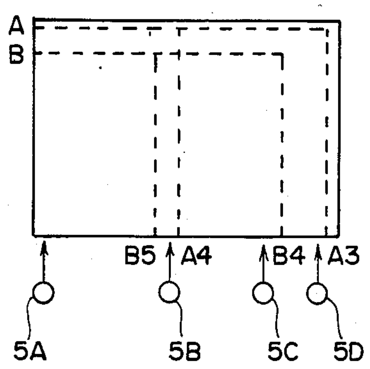
Fig. 3(B)
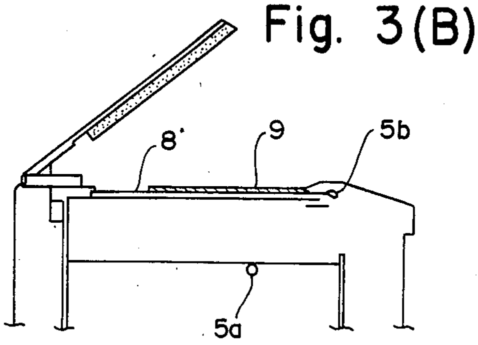
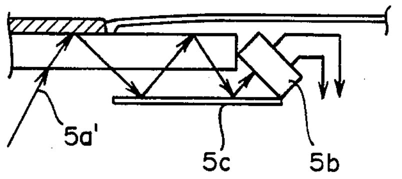
Fig. 3(C)
Document Size
| | 5A | 5B | 5C | 5D |
|---|---|---|---|---|
| B5 | Light Received | | | |
| A4 | Light Received | Light Received | | |
| B4 | Light Received | Light Received | Light Received | |
| A3 | Light Received | Light Received | Light Received | Light Received |
Fig. 4

ELECTROPHOTOGRAPHIC COPYING MACHINE WITH A FUNCTION FOR SELECTING HALF-SIZED COPY PAPER

BACKGROUND OF THE INVENTION

The present invention relates to a copying machine which comprises a means for detecting the document size with a dual page copying function for copying respective ranges onto different copy papers by halving the size of a document placed on a document table in the scanning direction of an optical system.

Recently, copying machines have been commercialized wherein plural kinds and sizes of copy papers are put in a ready-to-feed state, and a document size detecting means for the documents placed on the document table is provided, and the copy paper whose size is equal to the detected document size, selected and fed. Furthermore, in a copying machine providing a variable magnification copying function, the copy paper, responding to the detected document size and the set magnification ratio, is selected.

Furthermore, conventionally, there has been a copying machine providing a dual page copying function for copying respective ranges onto different copy papers by halving a document placed on the document table in the scanning direction of the optical system. The operation thereof is, for example, such that when two sheets of A4-size, documents or a opened book, either being equal to A3 size, are placed on the document table, the copying operation is performed twice in succession, and two sheets of A4-size copy paper are consecutively fed. Therefore, one half of the above-mentioned document range is copied onto the preceding copy paper and the other half is copied onto the second copy paper.

However, in the above-mentioned conventional copying machine providing the dual page copying function, the operator is required to select the copy paper whose size is half that of the size of the document placed on the document table. Also, among conventional copying machines providing the above-mentioned document size detecting means and the above-mentioned dual page copying function, no machine combines these functions, and therefore such a copying machine has the disadvantage that functions provided in the copying machine can not be utilized effectively.

SUMMARY OF THE INVENTION

In light of the above-mentioned conventional disadvantages, the present invention proposes to provide a copying machine having a function of selecting half-sized copy paper wherein a document size detecting function can be utilized effectively when the dual page copying operation is performed, and thereby the range wherein the document size detecting function is utilized can be expanded, and also dual page copying can be simplified.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description. To realize the above objects, according to the present invention, the electrophotographic copying machine is provided with a document size-detecting means and a dual page copying capability which provides a means for selecting a copy paper whose size is half that of the document size detected by the document size detecting means as the paper to be fed to the above-mentioned dual page copying means.

BRIEF DESCRIPTION OF THE DRAWINGS

The present invention will be better understood from the detailed description given hereinbelow and the accompanying drawings which are given by way of illustration only, and thus are not limitative of the present invention in which.

DETAILED DESCRIPTION OF THE INVENTION

Figure 2:
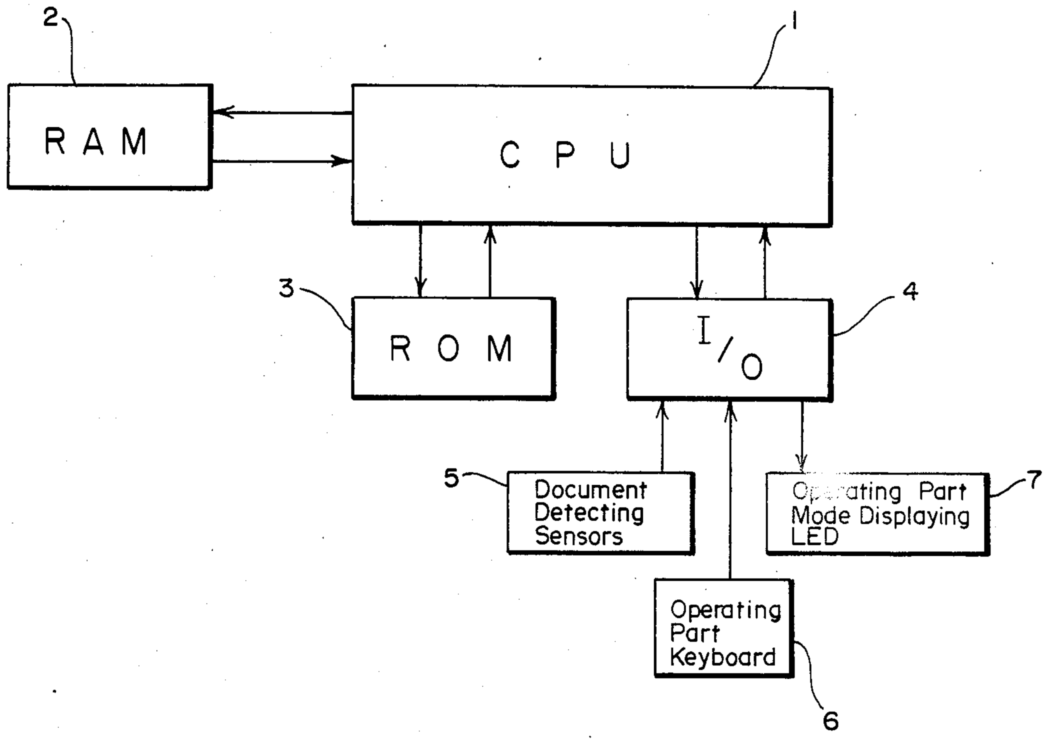
FIG. 2 is a block diagram of the same copying machine, and FIGS. 3 (A) through (C) and FIG. 4 are views showing the configuration of a document size sensor employed in a copying machine embodied by the present invention.

FIG. 2 is a block diagram of a copying machine having a function of selecting half-sized copy paper as embodied by the present invention, comprising:

A ROM 3 storing a program which controls the operation of a CPU 1 of a copying machine, a RAM 2 storing a variety of information to be input or read out, and an I/O 4, which are connected to the CPU 1 through an inner bus. Also, a document size sensor 5 installed under the document table, a setting key 6 which is pressed by the operator when operating the function of selecting half-sized copy paper, and a mode displaying LED 7 showing the operator that the function of selecting half-sized copy paper is under way, are connected to the I/O 4. The above-described setting key 6 and mode displaying LED 7 are placed on an operating part (not illustrated). In addition, for the document size sensors 5, sensors of a configuration as shown in FIG. 3 (A) through (C) and FIG. 4 are employed.

As shown in FIG. 3 (B), a plurality of sensors consisting of an infrared light emitting diode LED **5*a* and a photo diode 5*b* with a visible light cut-off filter receiving the light from this light emitting diode LED 5*a* are placed under the document table 8. As shown in detail in FIG. 3 (C), a light 5*a*′ from the light emitting diode LED 5*a* is first distributed onto the document 9, and the light reflected from this document 9 is distributed onto the above-mentioned photo diode 5*b* by a reflecting plate 5*c*. When no document is placed on the document table 8, the light from the light emitting diode LED 5*a* is not distributed onto the reflecting plate 5*c*, and thus is not received by the photo diode 5*b*. In addition, an ON signal is sent to the CPU when the photo diode 5*b* receives the distributed light. Accordingly, the size of the document placed on the document table can be detected by disposing a sensor constituting the light emitting diode LED 5*a* and the light receiving photo diode 5*b* at the position corresponding to each paper size as shown in FIG. 3 (A). The CPU of the copying machine monitors ON signals from sensors 5A through 5D disposed at the positions as shown in FIG. 3 (A), and detects the document size by means of signal combinations as shown in FIG. 4**.

Figure 1A:
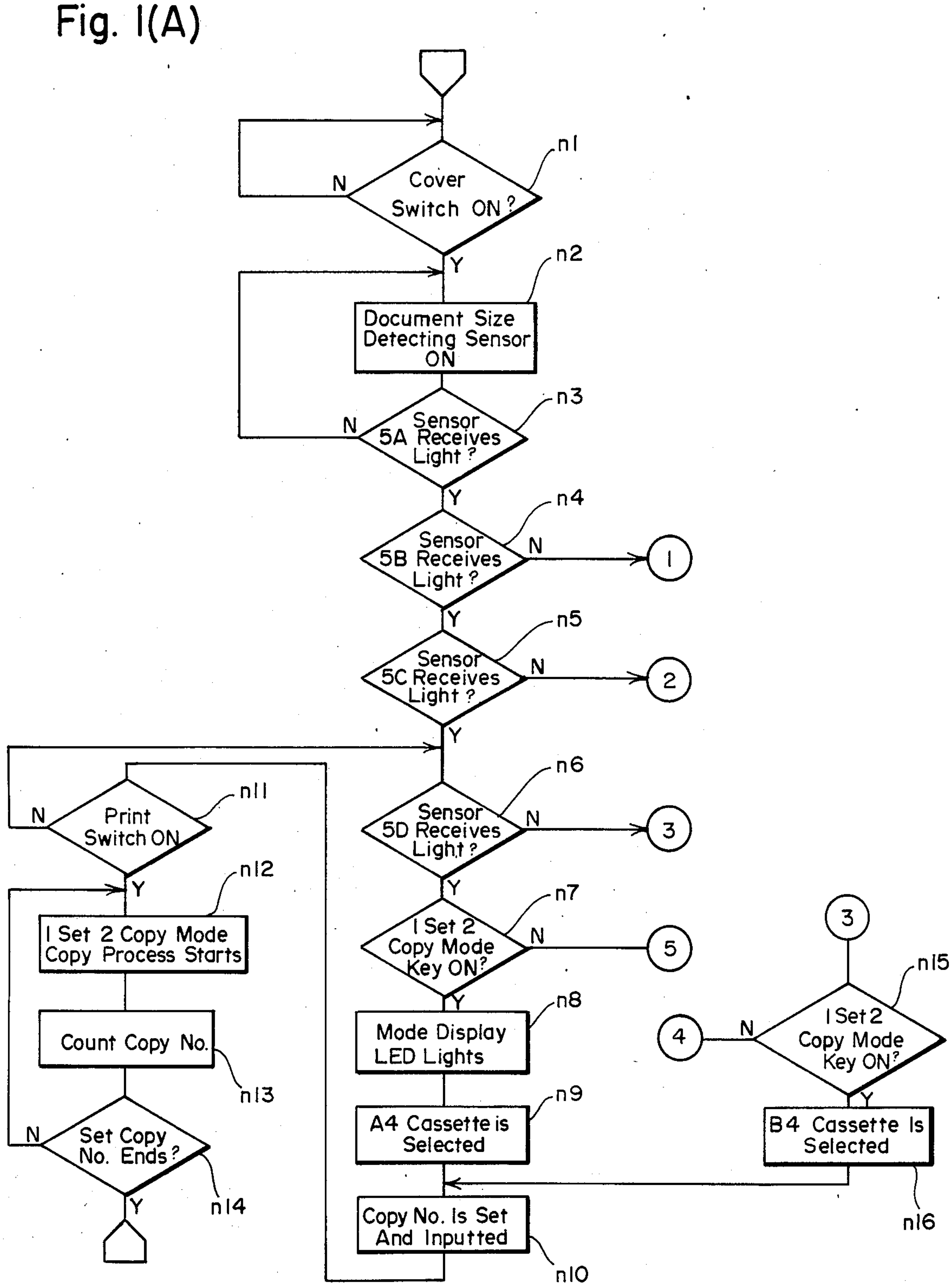
FIGS. 1 (A) and (B) are flowcharts showing the operation of a copying machine embodied by the present invention.
Figure 1:
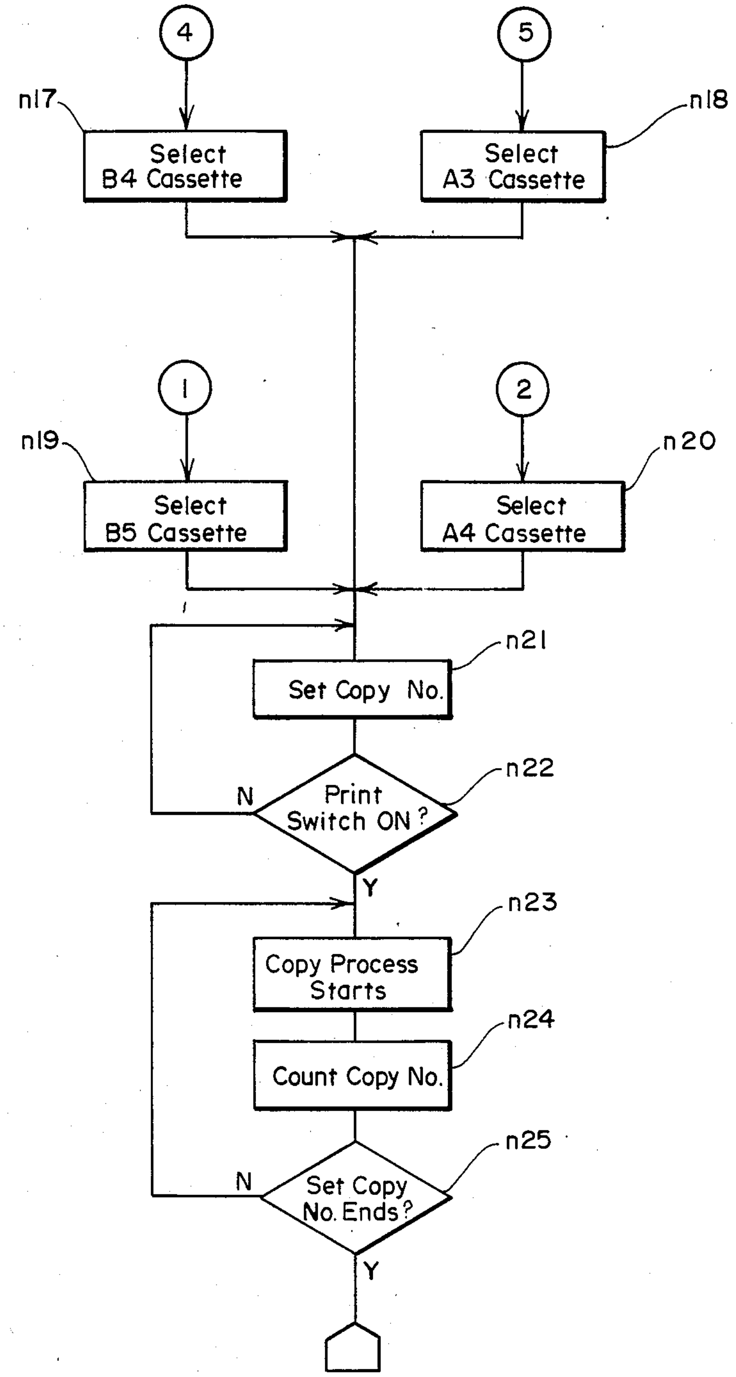

FIGS. 1 (A) and (B) are flowcharts showing the operation of a copying machine having the function of selecting half-sized copy paper as embodied by the present invention.

When a document is placed on the document table, step n1 turns on a switch when the document cover is closed over the document table, and the sequence proceeds to step n2. Detection of the document size is started by the document size sensors 5A through 5D disposed under the document table. In step n3, if the light receiving side of the sensor 5A at the document reference position is put in an ON state, placement of the document is recognized, subsequently in step n4; the decision is made as to whether or not the sensor 5B, positioned between the shorter sides of the sizes B5 and A4, has detected the document. When the sensor 5B has detected the document in step n4, the sequence proceeds to step n5, and here the decision is made on whether or not the sensor 5C, positioned on the longer side of the size B4 has detected the document. When the sensor 5C has detected the document in step n5, the sequence proceeds to step n6, and the decision is made on whether or not the sensor 5D, positioned on the the longer side of the size A3 which is the maximum size usable for a copying machine of this embodiment, has detected the document. When the sensor 5D has detected the document in step n6, it is decided that the document placed on the document table is of the size A3, and the sequence proceeds to step n7. In step n7, the decision is made as to whether or not the setting key 6 related to the present invention has been pressed by the operator and, if so, the function of selecting half-sized copy paper is brought into operation, and the mode display LED 7 of the operating part is lit in step n8. Thereafter, the sequence proceeds to step n9, and a cassette storing copy papers which are half the size of the detected document, namely, size A4, is selected as the paper feeding cassette among copy paper cassettes of plural sizes set in a ready-to-feed-paper state. Subsequently, the copy quantity is set in step n10, and when the print key starting the copying operation is pressed in step n11, the sequence proceeds to step n=n12, and the dual page copying operation is started. The dual page copying operation is counted every time it is completed in step n13, and the decision is made whether or not the set quantity is the same as the counted value in step n14, and, when they are identical, the operation proceeds to completion, but when not identical, the process returns to step n12 and repeats the dual page copying operation until it becomes the same. When the sensor 5B does not detect the document in step n4, the decision is made that the placed document is B5 size, and when the sensor 5C does not detect the document in step n5, it is decided that the document is of the size A4. However, in this embodiment, half-size copy paper is not used in either of the above-mentioned cases, and therefore the function of setting half-size copy paper is not selected. For this reason, when the document is not detected in steps n4 and n5, the sequence proceeds to steps n19 an n20 respectively, and the cassette storing copy paper of the same size as the detected document is selected. Thereafter, the copy quantity is set in step n21, and if the print switch is turned on in step n22, the normal copying operation starts in step n23. Furthermore, the copying operation is repeated until the numeric value counted in step n24 is recognized as equal to the set quantity in step n25. When the sensor 5D does not detect the document in step n6, it is decided that the placed document is size B4, and the sequence proceeds to step n15. In step n15, the decision is made on whether or not the setting key 6 is turned on, and, if so, the cassette storing B5 size copy paper is selected in step n16, and the sequence proceeds to step n10. If the setting key 6 is not turned on in step n15, it is decided to stay in the normal copy mode, and the sequence proceeds to step n17. In this step the cassette storing copy paper size B4 is selected, and the sequence proceeds to step n21. The normal copy mode is also decided when the setting key 6 is not turned on in step n7, and the sequence proceeds to step n18, and in this step the cassette storing A3 copy paper is selected, and the operating sequence proceeds to step n21.

In the above-mentioned operation, steps n7→n8→n9 and n15→n16 correspond to a means for selecting copy paper half the size of the document detected by the document size detecting means embodied by the present invention.

Furthermore, in a copying machine capable of using copy paper of sizes other than those in the above-mentioned embodiment, by placing the document size detecting means at the document table in a position corresponding to the paper size, the paper sizes capable of utilizing the means for selecting half-size copy paper as envisaged by the present invention can also be changed or increased. In addition, the document size detecting means can employ other publicly well known sensors.

In accordance with the present invention, the above-described configuration enjoys advantages such that the document size detecting function can be utilized effectively when the dual page copying machine is operated, and the range wherein the document size detecting function is utilized can be expanded, as well as simplyfying operation of the dual page copying operation.

While only certain embodiments of the present invention have been described, it will be apparent to those skilled in the art that various changes and modifications may be made therein without departing from the spirit and scope of the present invention as claimed.

What is claimed is:

1. A copying machine comprising a document size detecting circuit means for detecting paper size of a document placed on a document table and a dual page copying circuit means for copying two documents of the same size placed on the said document table onto different copy papers, respectively further including a circuit means for selecting a copy paper half the size of the detected by said document size circuit-detecting means.

2. The copying machine of claim 1, further including a circuit means for selecting a copy paper the same size as that detected by said document size circuit detecting means.

* * * * *